(12) United States Patent
Ohhashi

(10) Patent No.: US 10,671,330 B2
(45) Date of Patent: Jun. 2, 2020

(54) IMAGE RECORDING APPARATUS COMMUNICABLE WITH MOBILE TERMINAL FOR IDENTIFICATION OF THE IMAGE RECORDING APPARATUS

(71) Applicant: BROTHER KOGYO KABUSHIKI KAISHA, Nagoya-shi, Aichi-ken (JP)

(72) Inventor: Masashi Ohhashi, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/280,332

(22) Filed: Feb. 20, 2019

(65) Prior Publication Data

US 2019/0179579 A1 Jun. 13, 2019

Related U.S. Application Data

(60) Continuation of application No. 15/656,069, filed on Jul. 21, 2017, now Pat. No. 10,235,108, which is a
(Continued)

(30) Foreign Application Priority Data

Feb. 26, 2015 (JP) .................. 2015-036934

(51) Int. Cl.
*G06F 3/12* (2006.01)
*H04M 1/725* (2006.01)
(Continued)

(52) U.S. Cl.
CPC .......... *G06F 3/1236* (2013.01); *G06F 3/1204* (2013.01); *G06F 3/1226* (2013.01);
(Continued)

(58) Field of Classification Search
None
See application file for complete search history.

(56) References Cited

U.S. PATENT DOCUMENTS 9,075,554 B2 7/2015 Okigami
9,727,284 B2 8/2017 Ohhashi
(Continued)

FOREIGN PATENT DOCUMENTS

JP H08-044255 A 2/1996
JP H11-338317 A 12/1999
(Continued)

OTHER PUBLICATIONS

Notification of Reason for Refusal dated Jun. 19, 2018 received from the Japanese Patent Office in related application JP2-15-036934 together with English language translation.
(Continued)

*Primary Examiner* — Miya J Williams
(74) *Attorney, Agent, or Firm* — Scully, Scott, Murphy & Presser, PC

(57) ABSTRACT

An image recording apparatus includes: a first communication interface configured to perform communication according to a first communication standard; a second communication interface configured to perform communication according to a second communication standard that is different from the first communication standard and that is a wireless communication standard; an image recorder; and a controller. The controller receives image data and first identification information from an image-data output device via the first 02-19 communication interface. The controller broadcasts the received first identification information via the second communication interface.

11 Claims, 10 Drawing Sheets

Related U.S. Application Data division of application No. 15/048,111, filed on Feb. 19, 2016, now Pat. No. 9,727,284.

(51) Int. Cl.
| | | |
|---|---|---|
| *H04N 1/00* | (2006.01) | |
| *H04W 4/80* | (2018.01) | |
| *H04M 1/02* | (2006.01) | |

(52) U.S. Cl.
CPC ........ *G06F 3/1292* (2013.01); *H04M 1/0202* (2013.01); *H04M 1/7253* (2013.01); *H04N 1/00127* (2013.01); *H04W 4/80* (2018.02); *H04M 2250/04* (2013.01)

(56) References Cited

U.S. PATENT DOCUMENTS

| | | |
|---|---|---|
| 2002/0016833 A1 | 2/2002 | Yajima et al. |
| 2003/0152231 A1 | 8/2003 | Tomita et al. |
| 2005/0141018 A1 | 6/2005 | Oak et al. |
| 2007/0070398 A1 | 3/2007 | Oshima |
| 2007/0100972 A1 | 5/2007 | Otsuka et al. |
| 2009/0284794 A1 | 11/2009 | Ichihashi |
| 2011/0222110 A1 | 9/2011 | Asafuku |
| 2013/0143499 A1 | 6/2013 | Ando et al. |
| 2013/0201981 A1* | 8/2013 | Niwa .................... H04W 88/06 370/338 |
| 2013/0260683 A1 | 10/2013 | Suzuki et al. |
| 2014/0232554 A1 | 8/2014 | Nakagawa |
| 2015/0016436 A1 | 1/2015 | Namba et al. |
| 2016/0041798 A1* | 2/2016 | Maekawa ............. G06F 3/1222 358/1.15 |
| 2016/0239244 A1* | 8/2016 | Kanakubo ............ G06F 3/1222 |
| 2017/0374068 A1 | 12/2017 | Takano |

FOREIGN PATENT DOCUMENTS

| | | |
|---|---|---|
| JP | 2002049473 A1 | 2/2002 |
| JP | 2002247040 A | 8/2002 |
| JP | 2004064715 A | 2/2004 |
| JP | 2007-088888 A | 4/2007 |
| JP | 2009129242 A | 6/2009 |
| JP | 2012169779 A | 9/2012 |
| JP | 2013214804 A | 10/2013 |
| JP | 2014179973 A | 9/2014 |
| JP | 2015019211 A | 1/2015 |

OTHER PUBLICATIONS

Office Action dated Nov. 2, 2016 from related application U.S. Appl. No. 15/048,111.
Notice of Allowance dated Apr. 3, 2017 from related application U.S. Appl. No. 15/048,111.
Office Action dated Mar. 29, 2018 from related application U.S. Appl. No. 15/656,069.
Notice of Allowance dated Oct. 31, 2018 from related application U.S. Appl. No. 15/656,069.

* cited by examiner

IMAGE RECORDING APPARATUS
COMMUNICABLE WITH MOBILE
TERMINAL FOR IDENTIFICATION OF THE
IMAGE RECORDING APPARATUS

CROSS REFERENCE TO RELATED
APPLICATION

The present application is a continuation application of U.S. Ser. No. 15/656,069 filed on Jul. 21, 2017, which is a divisional application of U.S. Ser. No. 15/048,111 filed on Feb. 19, 2016, now U.S. Pat. No. 9,927,284 dated Aug. 8, 2017 and claims priority from Japanese Patent Application No. 2015-036934, which was filed on Feb. 26, 2015, the disclosures of each of which are herein incorporated by reference in their entirety.

BACKGROUND

Technical Field

The following disclosure relates to an image recording apparatus configured to receive image data from an image-data output device and execute a print processing for printing an image based on the received image data.

Description of the Related Art

There is known an image recording apparatus configured to receive image data from an image-data output device such as a scanner and execute a print processing for printing an image based on the received image data.

SUMMARY

In such an image recording apparatus, a user usually operates the scanner to select a printer that is to execute the print processing. However, a display of the scanner in most cases can display only a small amount of information such as a name of printer. This limitation makes it difficult for the user to identify the location of the printer that is to execute the print processing, based on information displayed on the display. Accordingly, an aspect of the disclosure relates to a technique capable of easily identifying a printer that is to execute a print processing.

In one aspect of the disclosure, an image recording apparatus includes: a first communication interface configured to perform communication according to a first communication standard; a second communication interface configured to perform communication according to a second communication standard that is different from the first communication standard and that is a wireless communication standard; an image recorder; and a controller. The controller is configured to perform: receiving image data and first identification information from an image-data output device via the first communication interface, the first identification information being identification information that is stored in a mobile terminal; and broadcasting the received first identification information via the second communication interface.

In one aspect of the disclosure, an image recording apparatus includes: a first communication interface configured to perform communication according to a first communication standard; a second communication interface configured to perform communication according to a second communication standard that is different from the first communication standard and that is a wireless communication standard; an image recorder; and a controller. The controller is configured to perform: receiving image data and first identification information from an image-data output device via the first communication interface, the first identification information being identification information that is stored in a mobile terminal; and when the controller receives the first identification information from the mobile terminal via the second communication interface, transmitting a response to the reception of the first identification information to the mobile terminal via the second communication interface.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Configuration of Communication System

Figure 1:
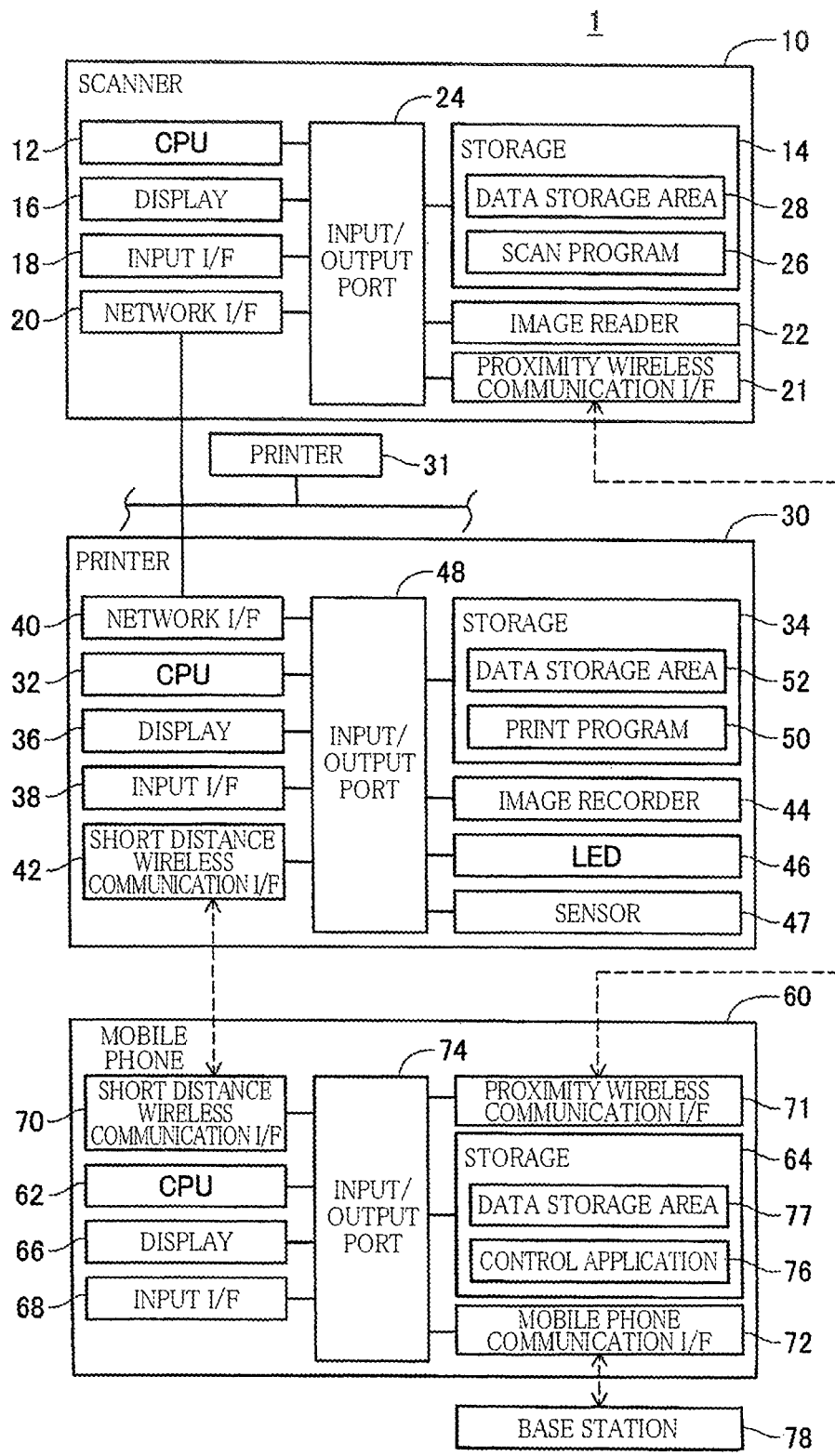
FIG. 1 is a block diagram illustrating a communication system.

FIG. 1 illustrates a communication system 1 including a scanner 10 as one example of an image-data output device, a printer 30 as one example of an image recording apparatus, a printer 31, and a mobile phone 60 as one example of a mobile terminal.

The configuration of a scanner 10 will be explained. The scanner 10 includes a central processing unit (CPU) 12, a storage 14, a display 16, an input interface 18, a network interface 20, a proximity wireless communication interface 21, and an image reader 22. These devices are communicable with each other via an input/output port 24.

The display 16 has a display surface for displaying various kinds of functions of the scanner 10. The input interface 18 includes keys for implementation of the functions of the scanner 10. One example of the input interface 18 is a touch screen provided integrally with the display 16. In this case, the input interface 18 accepts a user operation performed on an icon displayed on the display 16. Other examples of the input interface 18 include hardware keys. In the case where the input interface 18 includes hardware keys, the scanner 10 accepts an operation on one of the keys which corresponds to an icon displayed on the display 16.

The image reader 22 executes a scan processing for creating image data by reading an image formed on a document. Examples of the image reader 22 include a CCD image sensor and a contact image sensor.

The network interface 20 communicates with external devices. The network interface 20 is connected to a printer 30 and the printer 31 located on a network on which the scanner 10 is located. That is, the network interface 20 is capable of carrying out communication using a wired LAN as one example of a first communication standard. With this configuration, the scanner 10 is capable of carrying out data communication with the printer 30 and the printer 31 via the network interface 20. The proximity wireless communication interface 21 is capable of performing wireless communication in the form of Near Field Communication (NFC) according to ISO/IEC21481 or ISO/IEC18092. When the scanner 10 is allowed to perform the NFC wireless communication, the scanner 10 can perform data communication with the mobile phone 60.

The CPU 12 executes processings according to a scan program 26 stored in the storage 14. The scan program 26 is a program for execution of the scan processing. Hereinafter, the CPU 12 that executes programs such as the scan program 26 may be simply referred to as the name of the program. For example, the wording "the scan program 26 executes" may mean "the CPU 12 that executes the scan program 26 executes".

The storage 14 is constituted by a combination of a random access memory (RAM), a read only memory (ROM), a flash memory, a hard disk (HDD), a buffer provided for the CPU 12, and other similar devices. The storage 14 has a data storage area 28. The data storage area 28 is an area for storing various kinds of data including: image data created by the image reader 22; and data required for execution of the scan program 26.

The printer 30 and the printer 31 are similar in configuration to each other, and only the printer 30 will be described by way of example. The printer 30 includes a CPU 32 as one example of a controller, a storage 34, a display 36, an input interface 38, a network interface 40 as one example of a first communication interface, a short distance wireless communication interface 42 as one example of a second communication interface, an image recorder 44, an LED 46 as one example of a notifier, and a sensor 47. These devices are communicable with each other via an input/output port 48.

The display 36 has a display surface for displaying various kinds of functions of the printer 30. The input interface 38 includes keys for implementation of the functions of the printer 30. One example of the input interface 38 is a touch screen provided integrally with the display 36. In this case, the input interface 38 accepts a user operation performed on an icon displayed on the display 36. Other examples of the input interface 38 include hardware keys. In the case where the input interface 38 includes hardware keys, the printer 30 accepts an operation on one of the keys which corresponds to an icon displayed on the display 36. The image recorder 44 is a printing mechanism such as an ink-jet head. The CPU 32 inputs drive signals to the image recorder 44. In the case where the image recorder 44 is an ink-jet head, the ink-jet head ejects ink from its nozzles based on the input drive signals.

The LED 46 is provided on an outer surface of a housing of the printer 30. The LED 46 is energized to blink for visual recognition of a user. The sensor 47 is provided on a discharge tray for supporting printed sheets. The sensor 47 detects the presence or absence of sheet on the discharge tray.

The network interface 40 communicates with external devices. The network interface 40 is connected to the scanner 10 located on the network on which the printer 30 is located. With this configuration, the printer 30 is capable of carrying out data communication with the scanner 10. The short distance wireless communication interface 42 is capable of performing wireless communication using Bluetooth® (registered trademark of Bluetooth SIG) Low Energy (BLE) according to IEEE 802.15.1 and standards equivalent to it which are one example of a second communication standard. When the printer 30 is allowed to perform the BLE wireless communication, the printer 30 can perform data communication with the mobile phone 60.

The CPU 32 executes processings according to a print program 50 stored in the storage 34. The print program 50 is a program for execution of the print processing. Hereinafter, the CPU 32 that executes programs such as the print program 50 may be simply referred to as the name of the program. For example, the wording "the print program 50 executes" may mean "the CPU 32 that executes the print program 50 executes".

The storage 34 is constituted by a combination of a RAM, a ROM, a flash memory, an HDD, a buffer provided for the CPU 32, and other similar devices. The storage 34 has a data storage area 52 as one example of a storage. The data storage area 52 is an area for storing various kinds of data including data required for execution of the print program 50.

There will be next explained a configuration of the mobile phone 60. The mobile phone 60 includes a CPU 62, a storage 64, a display 66, an input interface 68, a short distance wireless communication interface 70, a proximity wireless communication interface 71, and a mobile phone communication interface 72. These devices are communicable with each other via an input/output port 74.

The display 66 has a display surface for displaying various kinds of functions of the mobile phone 60. The input interface 68 includes keys for implementation of the functions of the mobile phone 60. One example of the input interface 68 is a touch screen provided integrally with the display 66. In this case, the input interface 68 accepts a user operation performed on an icon displayed on the display 66. Other examples of the input interface 68 include hardware keys. In the case where the input interface 68 includes hardware keys, the mobile phone 60 accepts an operation on one of the keys which corresponds to an icon displayed on the display 66.

The short distance wireless communication interface 70 is capable of performing wireless communication using Bluetooth according to IEEE 802.15.1 and standards equivalent to it. When the mobile phone 60 is allowed to perform the Bluetooth wireless communication, the mobile phone 60 can perform data communication with the printer 30.

The proximity wireless communication interface 71 carries out the NFC wireless communication according to ISO/IEC21481 or ISO/IEC18092. When the mobile phone 60 is allowed to perform the NFC wireless communication, the mobile phone 60 can perform data communication with the scanner 10.

The mobile phone communication interface 72 carries out wireless mobile phone communication with a base station 78. When the mobile phone 60 is allowed to perform wireless mobile phone communication, the mobile phone 60 can perform data communication via the base station 78.

The CPU 62 executes processings according to a control application 76 stored in the storage 64. The control application 76 is a program for identification of a printer having executed the print processing. Hereinafter, the CPU 62 that executes programs such as the control application 76 may be simply referred to as the name of the program. For example, the wording "the control application 76 executes" may mean "the CPU 62 that executes the control application 76 executes".

The storage 64 is constituted by a combination of a RAM, a ROM, a flash memory, an HDD, a buffer provided for the CPU 62, and other similar devices. The storage 64 has a data storage area 77. The data storage area 77 is an area for storing various kinds of data including data required for execution of the control application 76.

Print Processing using Communication System

In the communication system 1, scan data created by scanning of the scanner 10 is transmitted to any one of the printer 30 and the printer 31. The printer having received the scan data executes the print processing for printing an image based on the scan data. Since the user in some cases does not grasp the location of the printer, the communication system 1 uses beacons using Bluetooth low energy (BLE), to notify the user about the location of the printer that is to execute the print processing.

BLE communication is low power communication in which a transmitter device transmits a beacon signal called an advertisement packet. The beacon signal has a small amount of data such as signs or symbols required for identification. The beacon signal does not contain instructions such as commands The beacon signal is transmitted not to a specific device but to a large number of unspecified devices at the same time. That is, the beacon signal is broadcasted.

When classified according to PDU type, i.e., Simple Network Management Protocol (SNMP) command type, the beacon signals can be classified into four types, namely, ADV_IND, ADV_DIRECT_IND, ADV_SCAN_IND, and ADV_NONCONN_IND. In this communication system 1, the ADV_IND beacon signals are preferably used among the beacon signals of the four types. A distance between a transmitting beacon signal and a receiving device, i.e., transmission range of the beacon signals is categorized into Immediate, Near, and Far, one of which can be set as needed. Immediate is a transmission range within a few centimeters. Near is a transmission range within a couple of meters. Far is a transmission range greater than ten meters away. In this communication system 1, the transmission range of the beacon signal is preferably set to Near.

In this communication system 1, the beacon signal contains preset specific ID information. A mobile terminal having received the beacon signal responds to the beacon signal when ID information contained in the received beacon signal and ID information of the mobile terminal are identical to each other. That is, when the transmitter device transmitting the beacon signal receives a response to the reception of the beacon signal, the mobile terminal having received the beacon signal is located within the transmission range of the beacon signal transmitted from the transmitter device. With these configurations, in the case where the printer that is to execute the print processing is employed as a device transmitting the beacon signal, and the mobile phone 60 is employed as a device receiving the beacon signal, the user can be notified of the printer that is to execute the print processing. It is noted that the beacon transmitted as a response is preferably a connection request packet for requesting a destination device to perform two-way communication with the device transmitting the beacon.

Specifically, the user having the mobile phone 60 approaches the scanner 10 and brings the mobile phone 60 close to the scanner 10 to instruct the scanner 10 to execute the scan processing. In this state, information for establishing the NFC wireless communication is transferred between the mobile phone 60 and the scanner 10. As a result, the NFC wireless communication is established. It is noted that information to be transmitted from the mobile phone 60 to the scanner 10 contains a serial number of the mobile phone 60 as identification information for identifying the mobile phone 60.

The user can operate the scanner 10 to perform settings of the scan processing, such as a resolution, and settings of the print processing for printing an image based on the scan data. The settings of the print processing include a setting (determination) of the printer used for executing the print processing, in addition to settings of a print color and a print document size, for example. In the setting of the printer, the display 16 of the scanner 10 displays a printer selection screen for the user to select one of the printer 30 and the printer 31 for execution of the print processing. The user selects a desired one of the printer 30 and the printer 31 on the printer selection screen. The following description will be provided assuming that the printer 30 is selected on the printer selection screen. The settings of the print processing also include a setting of whether secure printing as one example of storage printing is to be executed. It is noted that the secure printing is a print processing which is executed when information relating to the secure printing (such as image data and print settings) is transmitted from the scanner 10 to the printer 30, then the transmitted information is temporarily stored in the storage 34 of the printer 30, and then an instruction for printing an image based on the information relating to the secure printing which is stored in the storage 34 is input to the printer 30 through a communication path different from a communication path through which the image data (the scan data) relating to the secure printing is transmitted. In the case where the image data relating to the secure printing is transmitted from the scanner 10 to the printer 30 through a communication path including the network interface 40 as in the present embodiment, the print instruction of the secure printing may be transmitted through a communication path different from the communication path including the network interface 40, for example, through a communication path including the short distance wireless communication interface 42. Another example of the communication path used for transmission of the print instruction of the secure printing is a communication path using two-way BLE communication which will be described below. The print instruction of the secure printing may be directly input to the printer 30 with the input interface 38 of the printer 30, e.g., the touch screen displayed on the display 36.

The scanner 10 executes the scan processing when a start button is operated after the completion of the setting of the scan processing and the setting of the print processing. The scan data created in the scan processing is transmitted to the printer 30 via the network interface 20. In this transmission, setting information indicating the settings of the print processing and specific information including the serial number acquired from the mobile phone 60 are transmitted to the printer 30 with the scan data.

Upon receiving the data from the scanner 10, the printer 30 determines whether the print processing to be executed is the secure printing, based on the setting information contained in the data. When the print processing to be executed is not the secure printing, the printer 30 executes the print processing for printing an image based on the received scan data. As a result, a sheet on which the image based on the scan data is printed is discharged onto the discharge tray.

The printer 30 continuously transmits beacon signals via the short distance wireless communication interface 42. The beacon signal contains an identifier, distance information, strength information, specific information including the serial number of the mobile phone 60, and secure printing information. The identifier is identification information for identifying the beacon signal. One example of the identifier is a Bluetooth device address (BD address). In the BLE communication, a unique BD address for each Bluetooth device is contained in each of a beacon signal that is transferred before a switch to the two-way communication and a packet that is transferred after the switch to the two-way communication. The distance information indicates a transmission range of the beacon signal. The strength information indicates the strength of communication of the beacon signal. The secure printing information indicates whether the print processing to be executed by the printer 30 is the secure printing.

During transmission of the beacon signal from the printer 30, the user moves to the printer 30 or the printer 31. It is assumed that the printer 30 and the printer 31 are spaced apart from each other at some distance, and the user does not grasp the locations of the printer 30 and the printer 31, that is, the user does not recognize which printer is the printer 30 that is to execute the print processing. When the user approaches the printer 30 and enters the transmission range of the beacon signal, for example, the mobile phone 60 receives the beacon signal via the short distance wireless communication interface 70.

Upon receiving the beacon signal, the mobile phone 60 extracts the specific information from the beacon signal and determines whether the serial number contained in the specific information matches the serial number of the mobile phone 60. When the serial number contained in the specific information matches the serial number of the mobile phone 60, the mobile phone 60 transmits a response to the beacon signal to the printer 30 via the short distance wireless communication interface 70.

Upon receiving the response to the beacon signal, the printer 30 blinks the LED 46. This processing allows the user located near the printer 30 to recognize the printer 30 having executed the print processing and get the printed sheet from the printer 30 without doubt. It is noted that the LED 46 stops blinking when the printed sheet is taken from the discharge tray of the printer 30. Also, the printer 30 stops transmission of the beacon signal upon receiving the response to the beacon signal.

It is noted that when the user approaches the printer 31 and does not enter the transmission range of the beacon signal transmitted from the printer 30, the printer 30 does not blink the LED 46 because the mobile phone 60 does not receive the beacon signal from the printer 30. Since the printer 31 does not transmit the beacon signal, the printer 31 does not receive a response from the mobile phone 60 even when the mobile phone 60 enters the transmission range of the beacon signal transmitted from the printer 30, so that an LED of the printer 31 does not blink. This processing allows the user located near the printer 31 to recognize that the printer 31 is not a printer that is to execute the print processing. When the user approaches the printer 30, the LED 46 of the printer 30 blinks according to the above-described procedure.

When the printer 30 determines that the print processing to be executed is the secure printing, based on the setting information contained in the data received from the scanner 10, the printer 30 stores the received image data into the data storage area 52 and transmits the beacon signal via the short distance wireless communication interface 42. When the user enters the transmission range of the beacon signal transmitted from the printer 30 during this transmission, the mobile phone 60 receives the beacon signal. The mobile phone 60 transmits the response to the beacon signal via the short distance wireless communication interface 70. It is noted that the response transmitted from the mobile phone 60 is in the form of a connection request packet for requesting a switch to the two-way BLE communication.

Upon receiving the response to the beacon signal, the printer 30 stops transmitting the beacon signal. The printer 30 then establishes the two-way BLE communication with the mobile phone 60 in accordance with the request for the two-way communication from the beacon signal transmitted from the mobile phone 60. This establishment allows transfer of instructions, such as commands, between the printer 30 and the mobile phone 60. It is noted that the printer 30 blinks the LED 46 upon receiving the response to the beacon signal.

The mobile phone 60 determines whether the print processing to be executed by the printer 30 is the secure printing, based on the secure printing information contained in the beacon signal received from the printer 30. It is assumed in this description that the mobile phone 60 determines that the print processing to be executed by the printer 30 is the secure printing. When the print processing to be executed by the printer 30 is the secure printing, the display 66 of the mobile phone 60 displays a print confirmation screen. The print confirmation screen contains an OK button and a comment indicating that the printer 30 is to execute the secure printing. The OK button is a button for allowing execution of the secure printing. When the OK button is operated, the printer 30 executes the print processing.

Specifically, the OK button is operated on the display 66 of the mobile phone 60, the mobile phone 60 uses the two-way BLE communication to transmit a print instruction to the printer 30. Upon receiving the print instruction from the mobile phone 60, the printer 30 executes the print processing based on the image data stored in the data storage area 52. The printer 30 discharges the sheet printed in the print processing onto the discharge tray, and stops blinking the LED 46 when the printed sheet is taken from the discharge tray.

In the communication system 1 as described above, the printer that is to execute the print processing transmits the beacon signal using the BLE communication to determine whether the user enters the transmission range of the beacon signal transmitted from the printer 30. When the user enters the transmission range of the beacon signal, the LED 46 blinks. This processing allows the user to easily recognize the printer 30 having executed the print processing and get the printed sheet from the printer 30 without doubt.

In the secure printing in the communication system 1, the print processing is executed only when the user enters the transmission range of the beacon signal transmitted from the printer that is to execute the print processing. That is, in the secure printing, only when the user is located near the printer that is to execute the print processing, the print processing is executed. This processing ensures confidentiality of the printed sheet. In the secure printing, the display 66 of the mobile phone 60 displays the print confirmation screen, and when the OK button is operated on the print confirmation screen, the print processing is executed. This processing further ensures the confidentiality of the printed sheet.

Scan Program, Print Program, and Control Application

The above-described print processing is executed by execution of the scan program 26 by the CPU 12 of the scanner 10, execution of the print program 50 by the CPU 32 of the printer 30, and execution of the control application 76 by the CPU 62 of the mobile phone 60. There will be next explained (i) a flow of processings executed when the scan program 26 is executed by the CPU 12 of the scanner 10 with reference to FIG. 2, (ii) a flow of processings executed when the print program 50 is executed by the CPU 32 of the printer 30 with reference to FIGS. 3 and 4, and (iii) a flow of processings executed when the control application 76 is executed by the CPU 62 of the mobile phone 60 with reference to FIGS. 5 and 6.

Figure 2:
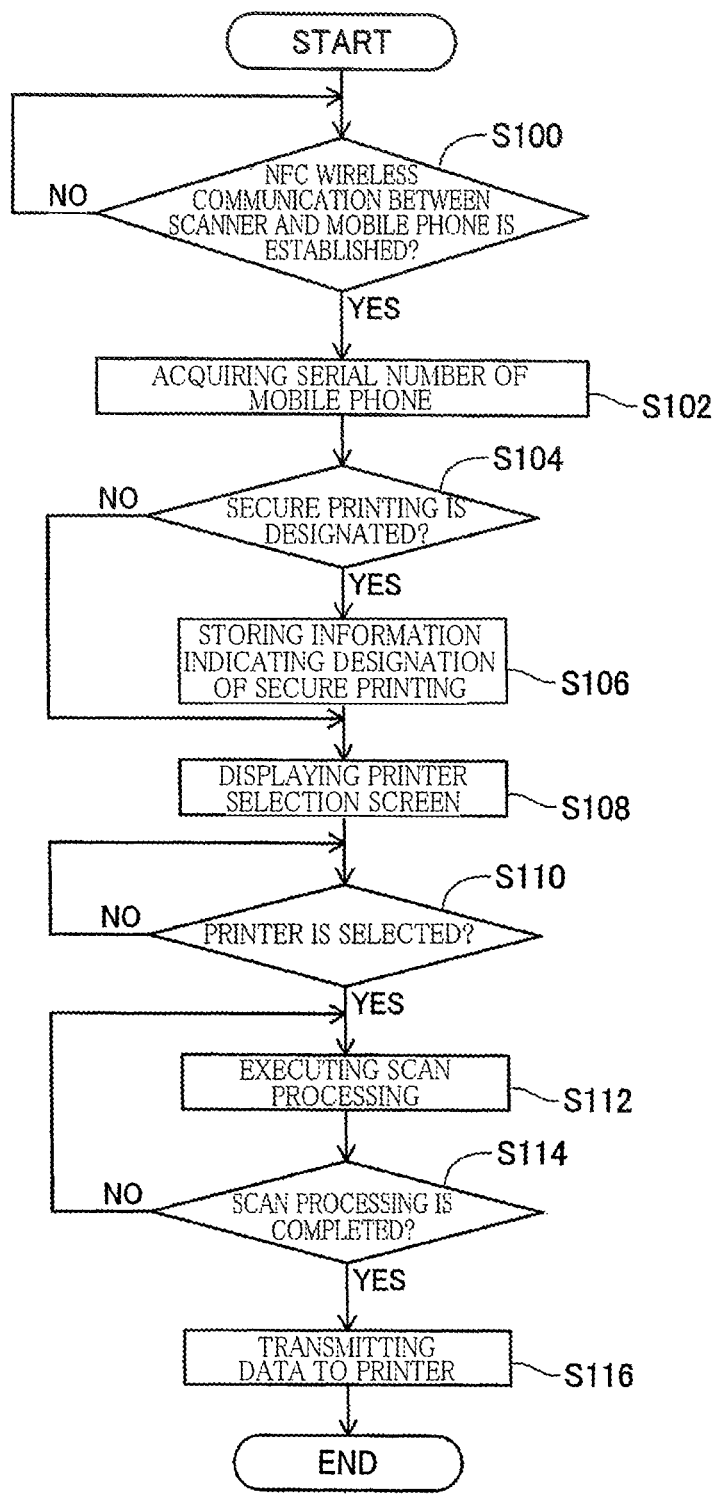
FIG. 2 is a flow chart illustrating processings executed by a scanner.

When the scan program 26 is executed by the CPU 12 in the scanner 10, as illustrated in FIG. 2, the CPU 12 at S100 determines whether the NFC wireless communication between the scanner 10 and the mobile phone 60 is established. When the NFC wireless communication between the scanner 10 and the mobile phone 60 is not established (S100: NO), the CPU 12 repeats the processing at S100. When the NFC wireless communication between the scanner 10 and the mobile phone 60 is established (S100: YES), the CPU 12 at S102 acquires the serial number of the mobile phone 60 over the established NFC wireless communication.

The CPU 12 at S104 determines whether the print processing designating the secure printing is set by a user operation on the input interface 18 of the scanner 10. When the print processing designating the secure printing is set (S104: YES), the CPU 12 at S106 stores information indicating that the secure printing is designated, and this flow goes to S108. When the print processing designating the secure printing is not set (S104: NO), this flow goes to S108 by skipping S106.

The CPU 12 at S108 displays the printer selection screen on the display 16 of the scanner 10. The CPU 12 at S110 determines whether the printer that is to execute the print processing is selected on the printer selection screen. When the printer is not selected on the printer selection screen (S110: NO), the CPU 12 repeats the processing at S110. When the printer is selected on the printer selection screen (S110: YES), the CPU 12 at S112 executes the scan processing.

The CPU 12 at S114 determines whether the scan processing is completed. When the scan processing is not completed (S114: NO), this flow returns to S112. When the scan processing is completed (S114: YES), the CPU 12 at S116 transmits data to the printer selected at S110 via the network interface 20. This data contains: the specific information containing the serial number acquired at S102; the setting information about the print processing; and the scan data created at S112. When the information indicating that the secure printing is designated is stored at S106, the setting information contains the information indicating that the secure printing is designated. Upon completion of the processing at S116, this flow ends.

Figure 3:
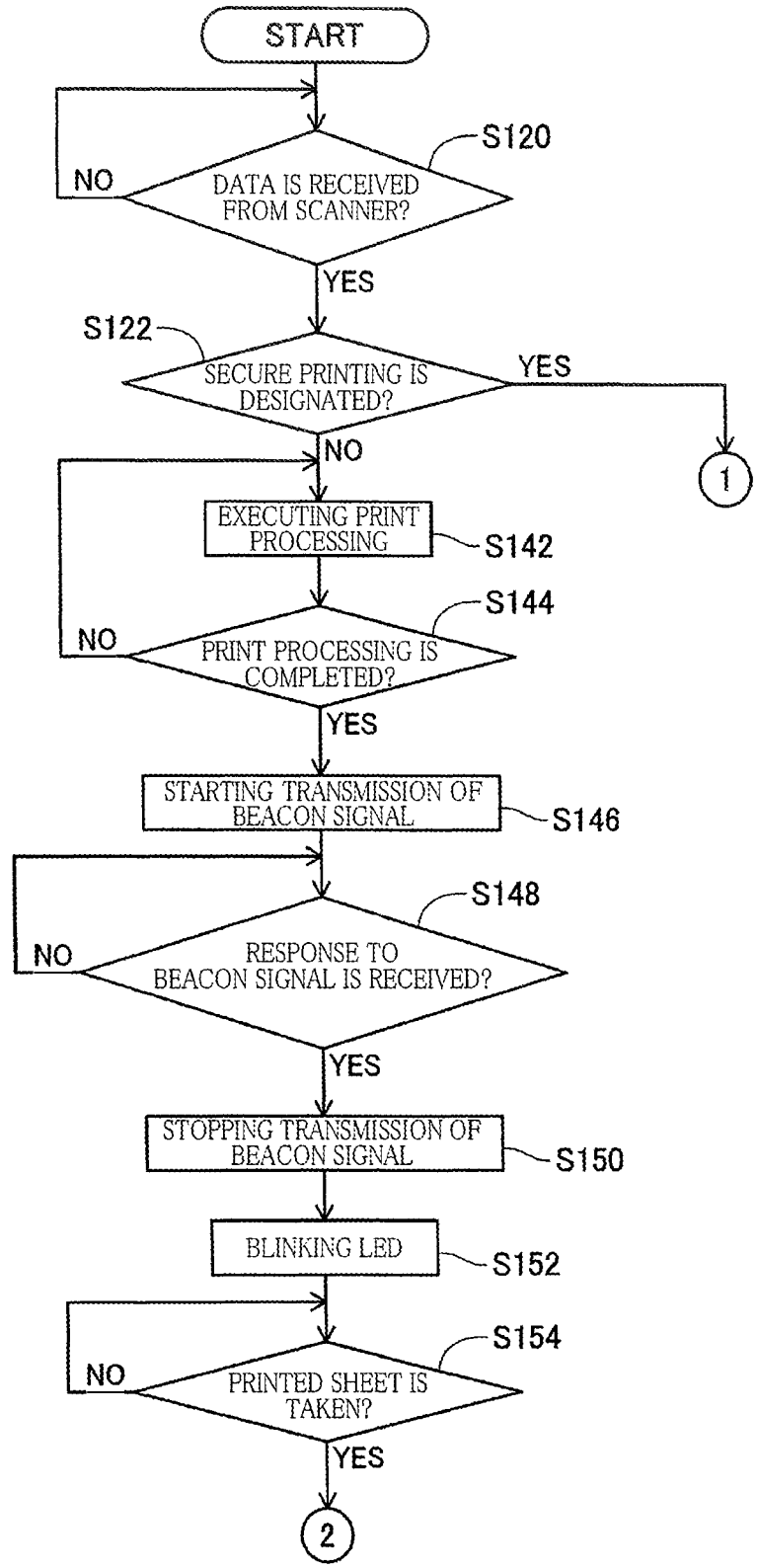
FIG. 3 is a flow chart illustrating processings executed by a printer.
Figure 4:
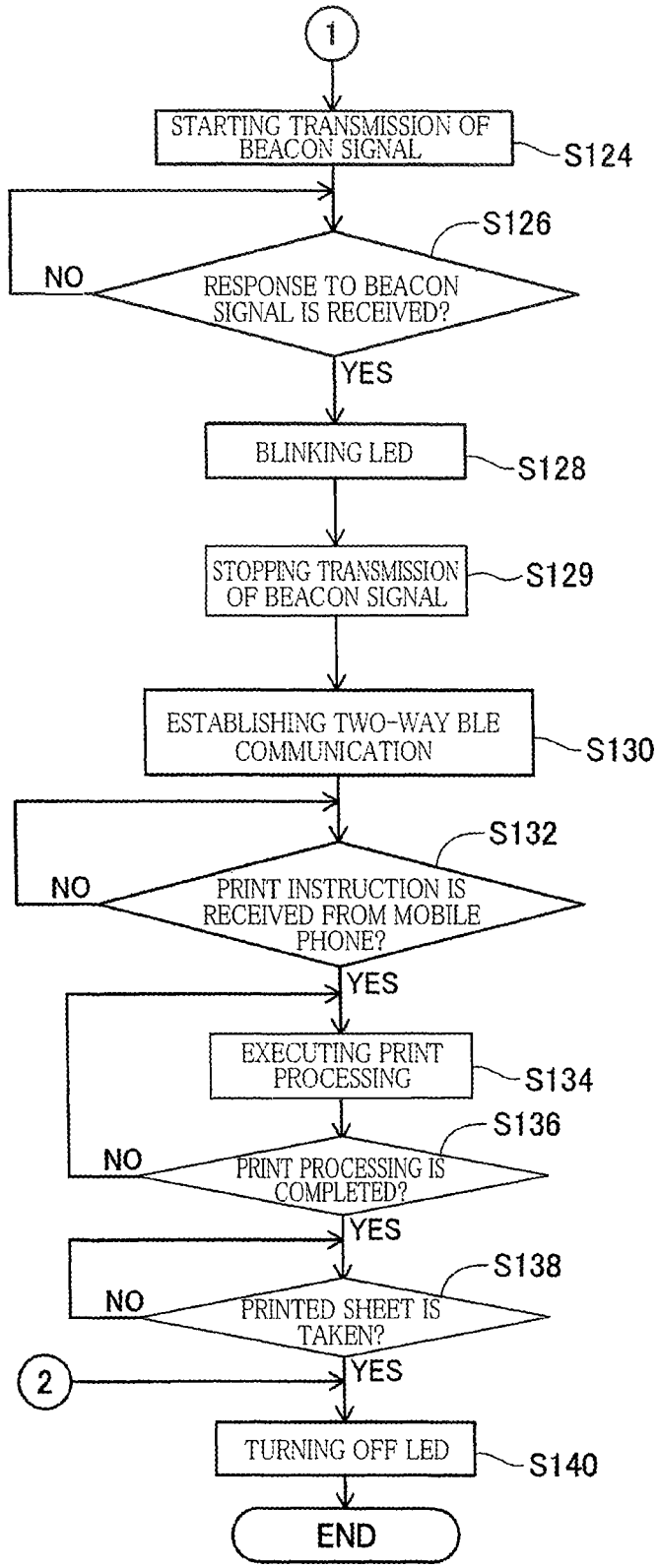
FIG. 4 is a flow chart illustrating processings executed by the printer.

When the print program 50 is executed by the CPU 32 in the printer 30, as illustrated in FIG. 3, the CPU 32 at S120 determines whether the data is received from the scanner 10. When the data is not received from the scanner 10 (S120: NO), the CPU 32 repeats the processing at S120. When the data is received from the scanner 10 (S120: YES), the CPU 32 at S122 determines whether the print processing for printing an image based on the scan data is the secure printing.

When the print processing for printing an image based on the scan data is the secure printing (S122: YES), the CPU 32 at S124 starts transmitting the beacon signal, i.e., the advertisement packet, via the short distance wireless communication interface 42. The CPU 32 at S126 determines whether the CPU 32 receives the response to the beacon signal via the short distance wireless communication interface 42. When the response to the beacon signal is not received (S126: NO), the CPU 32 repeats the processing at S126. When the response to the beacon signal is received (S126: YES), the CPU 32 blinks the LED 46 at S128. As described above, the received response is a connection request packet for requesting the two-way communication. The CPU 32 at S129 stops transmitting the beacon signal and at S130 establishes the two-way BLE communication with the mobile phone 60 in accordance with the request of the connection request packet received at S126, and this flow goes to S132.

The CPU 32 at S132 determines whether the CPU 32 receives the print instruction from the mobile phone 60 over the two-way BLE communication. When the print instruction is not received from the mobile phone 60 (S132: NO), the CPU 32 repeats the processing at S132. When the print instruction is received from the mobile phone 60 (S132: YES), the CPU 32 executes the print processing at S134.

The CPU 32 at S136 determines whether the print processing is completed. When the print processing is not completed (S136: NO), this flow returns to S134. When the print processing is completed (S136: YES), the CPU 32 at S138 determines whether the printed sheet is taken from the discharge tray. It is noted that the CPU 32 uses a detection value of the sensor 47 to determine the presence or absence of the printed sheet on the discharge tray. When the printed sheet is not taken from the discharge tray (S138: NO), the CPU 32 repeats the processing at S138. When the printed sheet is taken from the discharge tray (S138: YES), the CPU 32 turns off the LED 46 at S140, and this flow ends.

When the CPU 32 determines at S122 that the print processing for printing an image based on the scan data is not the secure printing (S122: NO), the CPU 32 executes the print processing at S142. The CPU 32 at S144 determines whether the print processing is completed. When the print processing is not completed (S144: NO), this flow returns to S142. When the print processing is completed (S144: YES), the CPU 32 at S146 starts transmitting the beacon signal.

The CPU 32 at S148 determines whether the CPU 32 receives the response to the beacon signal via the short distance wireless communication interface 42. When the CPU 32 does not receive the response to the beacon signal (S148: NO), the CPU 32 repeats the processing at S148. When the response to the beacon signal is received (S148: YES), the CPU 32 at S150 stops transmitting the beacon signal. The CPU 32 blinks the LED 46 at S152. The CPU 32 at S154 determines whether the printed sheet is taken from the discharge tray. When the printed sheet is not taken from the discharge tray (S154: NO), the CPU 32 repeats the processing at S154. When the printed sheet is taken from the discharge tray (S154: YES), the CPU 32 turns off the LED 46 at S140, and this flow ends.

Figure 5:
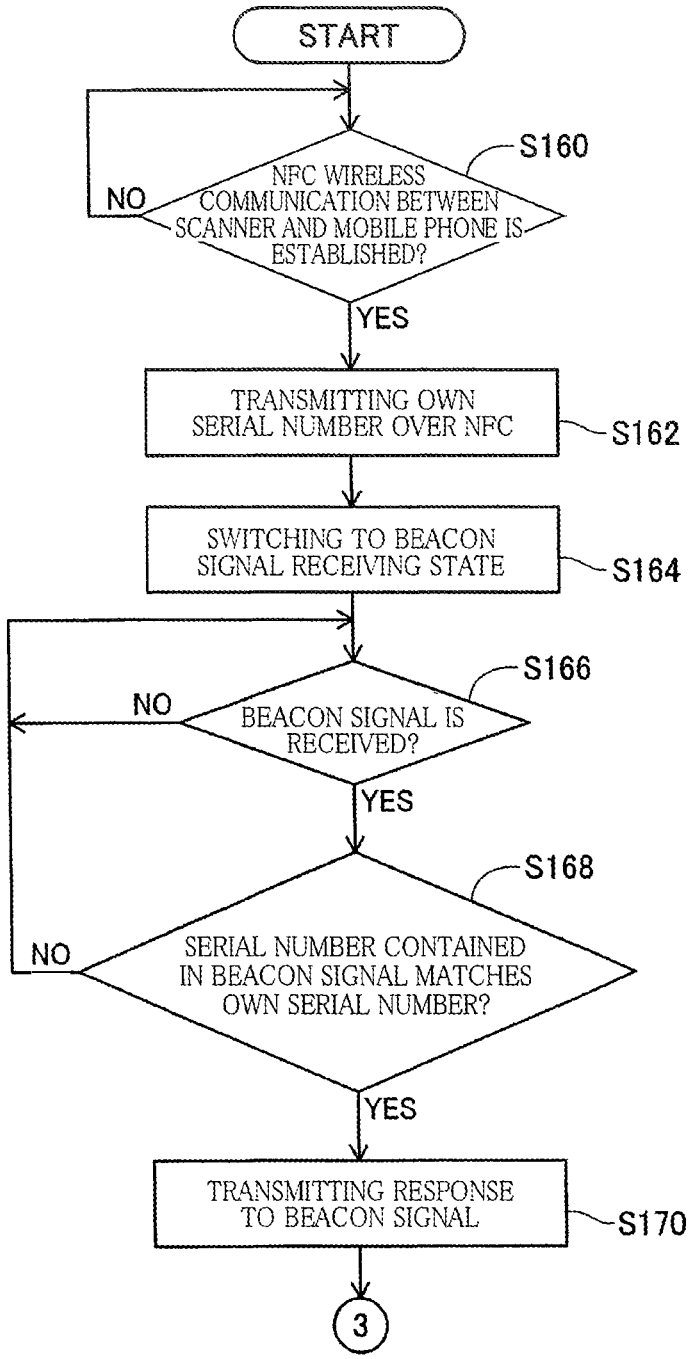
FIG. 5 is a flow chart illustrating processings executed by a mobile phone.
Figure 6:
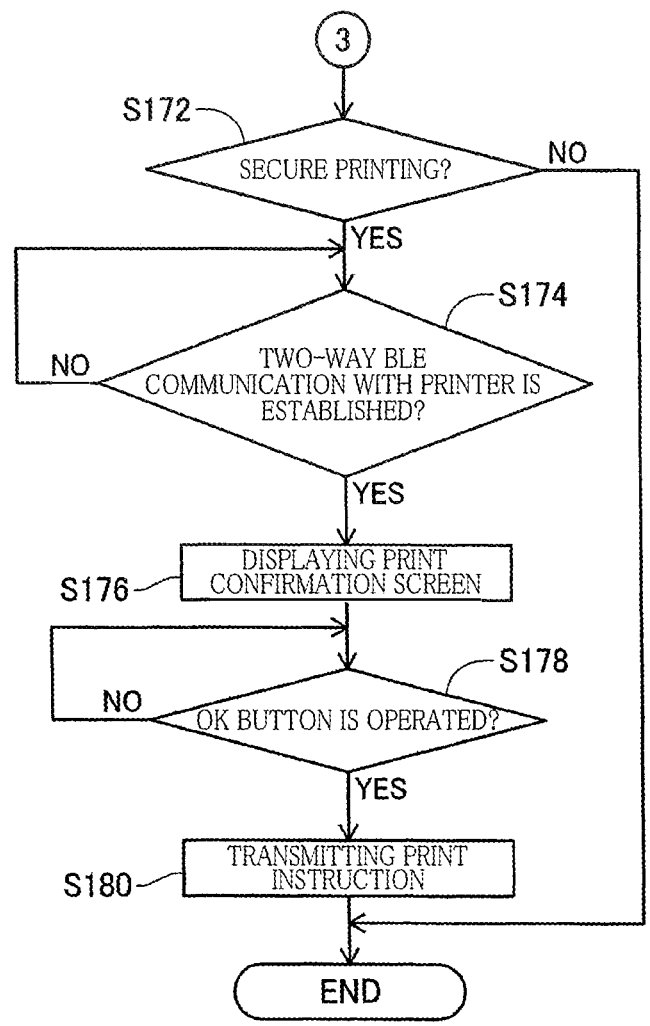
FIG. 6 is a flow chart illustrating processings executed by the mobile phone.

When the control application 76 is executed by the CPU 62 in the mobile phone 60, as illustrated in FIG. 5, the CPU 62 at S160 determines whether the NFC wireless communication between the scanner 10 and the mobile phone 60 is established. When the NFC wireless communication between the scanner 10 and the mobile phone 60 is not established (S160: NO), the CPU 62 repeats the processing at S160. When the NFC wireless communication between the scanner 10 and the mobile phone 60 is established (S160: YES), the CPU 62 at S162 transmits the serial number of the mobile phone 60 over the established NFC wireless communication, and this flow goes to S164. The CPU 62 at S164 switches the mobile phone 60 to a state in which the CPU 62 can receive the beacon signal. That is, the short distance wireless communication interface 70 is energized.

The CPU 62 at S166 determines whether the CPU 62 receives the beacon signal. When the beacon signal is not received (S166: NO), the CPU 62 repeats the processing at S166. When the beacon signal is received (S166: YES), the CPU 62 at S168 determines whether the serial number contained in the beacon signal matches the serial number of the mobile phone 60. When the serial number contained in the beacon signal does not match the serial number of the mobile phone 60 (S168: NO), this flow returns to S166.

When the serial number contained in the beacon signal matches the serial number of the mobile phone 60 (S168: YES), the CPU 62 at S170 transmits the response to the beacon signal via the short distance wireless communication interface 70. It is noted that the beacon transmitted as the response is a connection request packet. The CPU 62 at S172 determines whether the print processing to be executed by the printer is the secure printing. It is noted that this determination is performed based on the secure printing information contained in the beacon signal received from the printer as described above.

When the print processing to be executed by the printer is the secure printing (S172: YES), the CPU 62 at S174 determines whether the two-way BLE communication with the printer is established in accordance with the request transmitted at S170 as the connection request packet. When the two-way BLE communication is established (S174: YES) this flow goes to S176. When the two-way communication is not established (S174: NO), the CPU 62 repeats this processing until the two-way communication is established. It is noted that the CPU 62 can determine that the two-way communication is established with the printer to which the response is transmitted at S170, by determining that a packet received after the establishment of the two-way communication contains the identification information contained in the beacon signal that is determined to be received at S166.

The CPU 62 at S176 displays the print confirmation screen on the display 66 of the mobile phone 60. The CPU 62 at S178 determines whether the OK button is operated on the print confirmation screen. When the OK button is not operated on the print confirmation screen (S178: NO), the CPU 62 repeats the processing at S178. When the OK button is operated on the print confirmation screen (S178: YES), the CPU 62 at S180 transmits the print instruction to the printer over the two-way BLE communication, and this flow ends. When the CPU 62 at S172 determines that the print processing to be executed by the printer is not the secure printing (S172: NO), this flow ends without execution of the processings at S174-S180.

It is noted that also when the print processing to be executed by the printer is the secure printing, the response transmitted at S170 is the connection request packet. In BLE, however, a device having received the connection request packet does not necessarily follow the connection request. In the present embodiment, the printer 30 terminates the above-described procedure without establishing the two-way communication by ignoring the request of the connection request packet received at S148 in FIG. 3. Accordingly, when the CPU 62 at S172 determines that the print processing to be executed by the printer is not the secure printing, the CPU 62 can terminate the above-described procedure.

Second Embodiment

There will be next explained operations of the communication system 1 in a second embodiment. It is noted that the communication system 1 in the second embodiment is similar in configuration to the communication system 1 in the first embodiment, and an explanation of which is dispensed with.

While the printer that is to execute the print processing transmits the beacon signal in the communication system 1 in the first embodiment, the mobile phone 60 transmits the beacon signal in the communication system 1 in the second embodiment. Specifically, when the scan processing is executed by the scanner 10, as in the first embodiment, the scanner 10 transmits the scan data, the setting information indicating the settings of the print processing, and the specific information including the serial number acquired from the mobile phone 60, to the printer that is to execute the print processing. The printer having received these data is switched to a state in which the printer can receive the beacon signal. That is, the short distance wireless communication interface 42 of the printer having received these data is energized, and the printer is switched to a state in which the printer can receive data via the short distance wireless communication interface 42.

The mobile phone 60 continuously transmits the beacon signal. Beacon information transmitted from the mobile phone 60 contains an identifier, distance information, strength information, and specific information. The specific information contains the serial number of the mobile phone 60. Thus, when the user having the mobile phone 60 approaches a printer having received information such as scan data, e.g., the printer 30, and the printer 30 gets in a transmission range of the beacon signal transmitted from the mobile phone 60, the printer 30 receives the beacon signal via the short distance wireless communication interface 42.

The printer 30 extracts the specific information from the received beacon signal and determines whether the serial number contained in the specific information matches the serial number of the specific information contained in the data received from the scanner 10. When the serial number contained in the specific information of the beacon information matches the serial number of the specific information contained in the data received from the scanner 10, the CPU 32 blinks the LED 46. This processing in the second embodiment allows the user to easily recognize the printer 30 having executed the print processing and get the printed sheet from the printer 30 without doubt as in the first embodiment. It is noted that, upon receiving the beacon signal, the printer 30 transmits a response to the beacon signal to the mobile phone 60 via the short distance wireless communication interface 42. Upon receiving the response to the beacon signal, the mobile phone 60 stops transmitting the beacon signal. It is noted that this response contains the secure printing information.

In the communication system 1 in the second embodiment, only when the user is located near the printer that is to execute the print processing in the secure printing, the CPU 32 executes the print processing. Specifically, after the mobile phone 60 receives the response to the beacon signal and stops transmitting the beacon signal, the mobile phone 60 establishes the two-way BLE communication with the printer 30 instead of the BLE communication for transmitting the beacon signal. That is, when the mobile phone 60 determines that the printer 30 is located within the transmission range of the beacon signal, the mobile phone 60 establishes the two-way BLE communication. The establishment of the two-way BLE communication allows instructions such as commands to be transferred between the printer 30 and the mobile phone 60.

Upon receiving the response to the beacon signal transmitted from the mobile phone 60, the mobile phone 60 determines whether the secure printing is set as the print processing that is to be executed by the printer 30, based on the secure printing information contained in the response. When the secure printing is set as the print processing that is to be executed by the printer 30, the mobile phone 60 establishes the BLE wireless communication with the printer 30. The display 66 of the mobile phone 60 then displays the print confirmation screen. When the OK button is operated on the print confirmation screen, the mobile phone 60 transmits the print instruction to the printer 30. As a result, the printer 30 executes the print processing. In the communication system 1 in the second embodiment, as in the first embodiment, the print processing is executed only when the user is located near the printer that is to execute the print processing. This processing ensures the confidentiality of the printed sheet.

Figure 7:
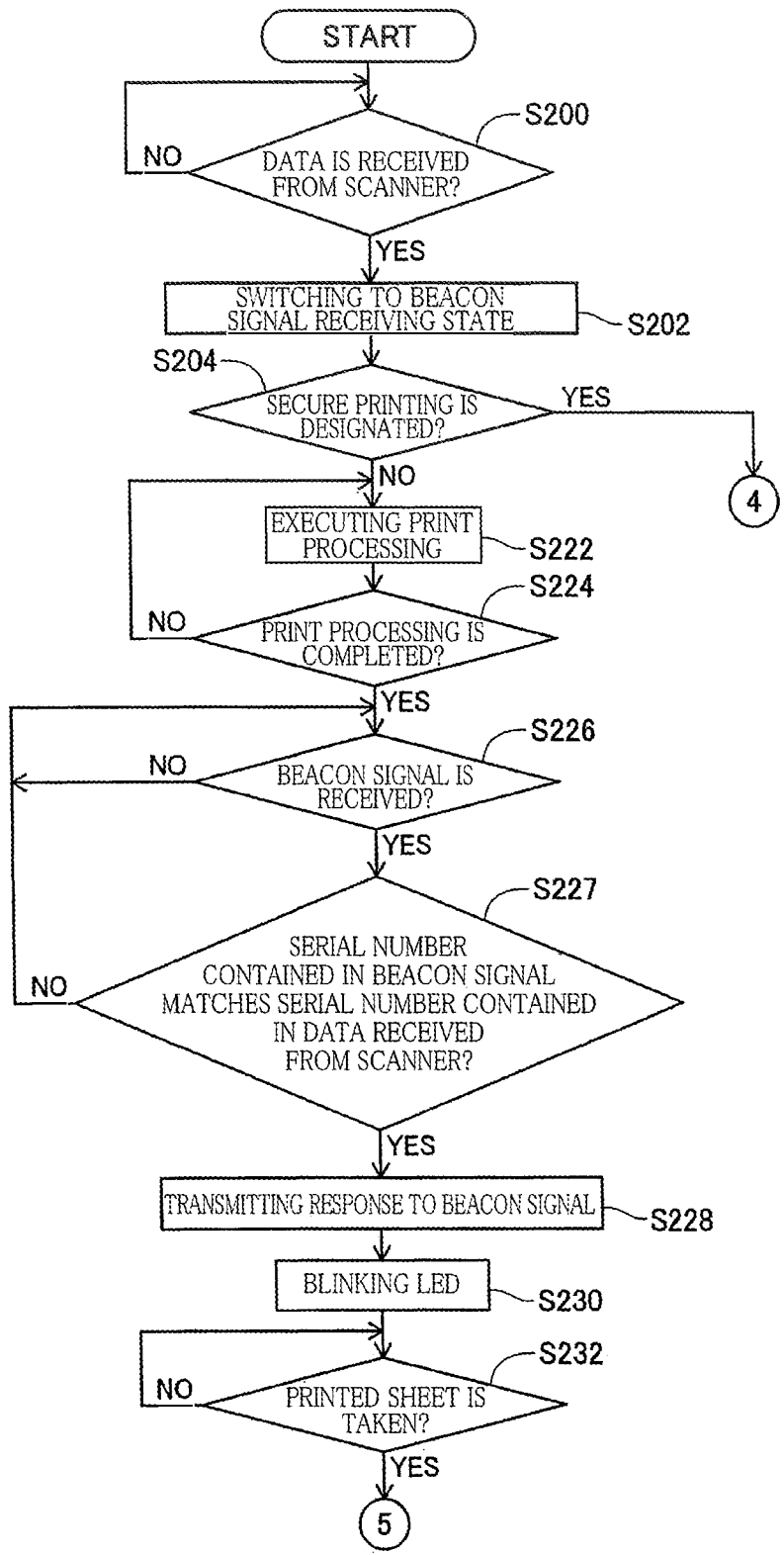
FIG. 7 is a flow chart illustrating processings executed by a printer according to a second embodiment.
Figure 8:
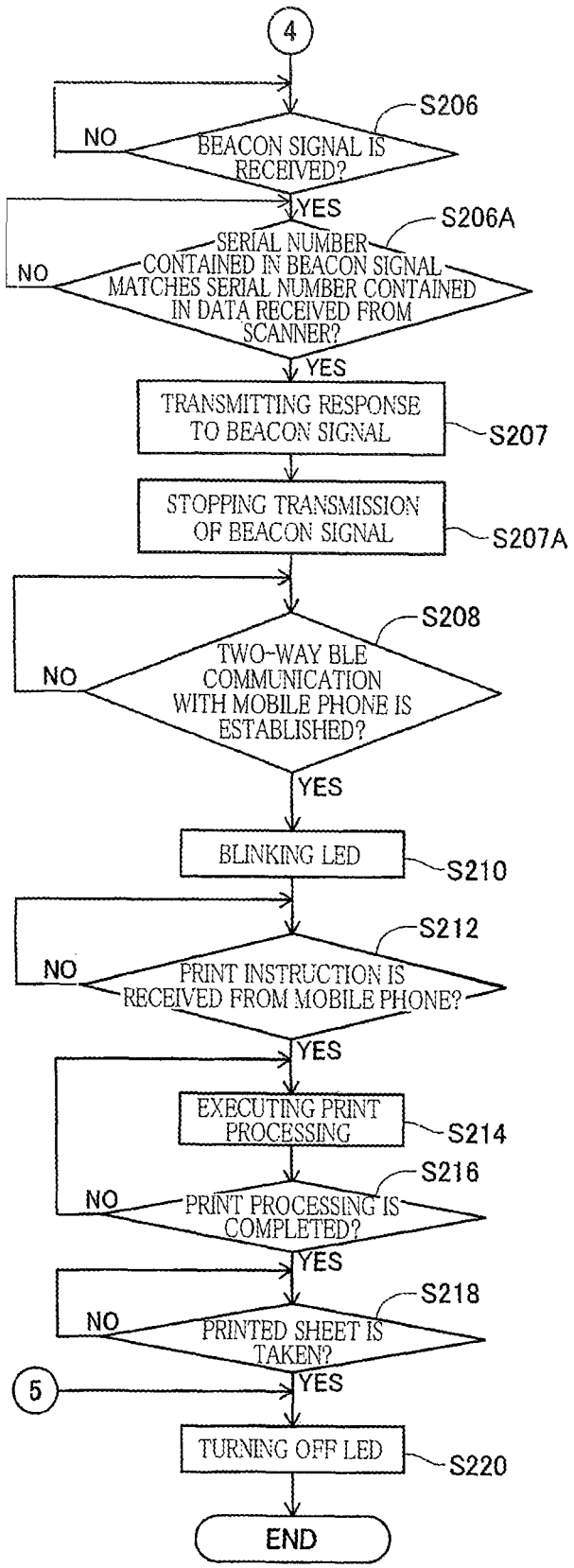
FIG. 8 is a flow chart illustrating processings executed by the printer according to the second embodiment.
Figure 9:
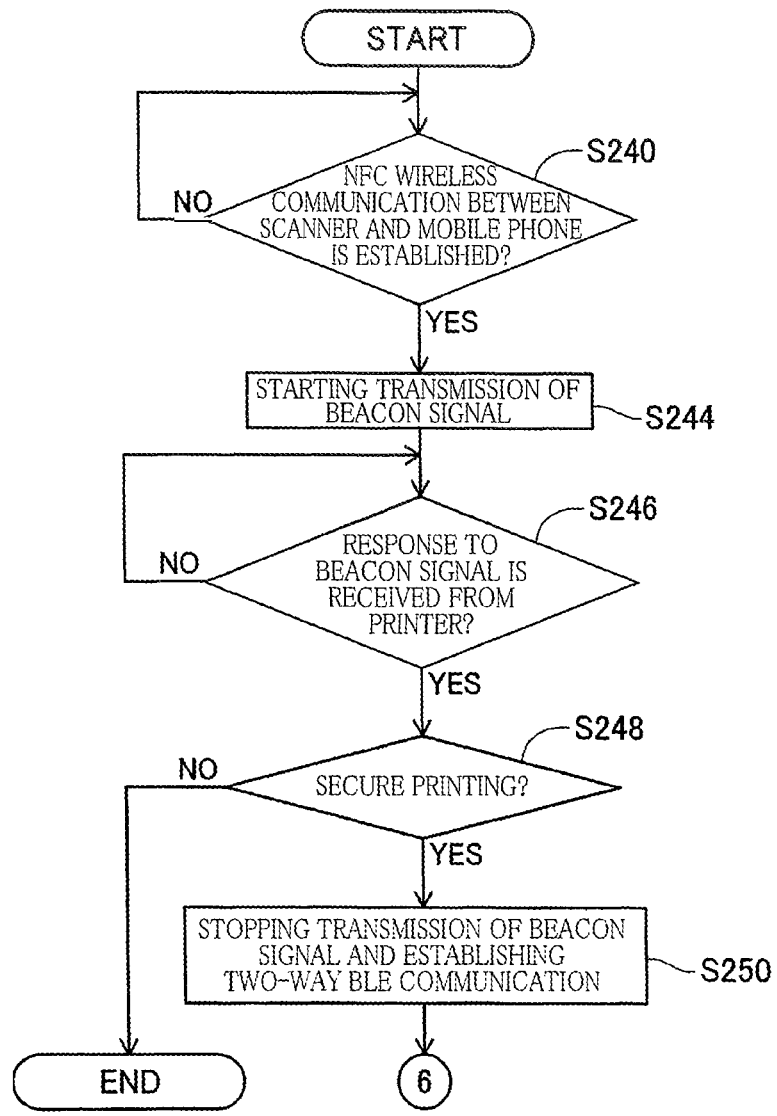
FIG. 9 is a flow chart illustrating processings executed by a mobile phone in the second embodiment.
Figure 10:
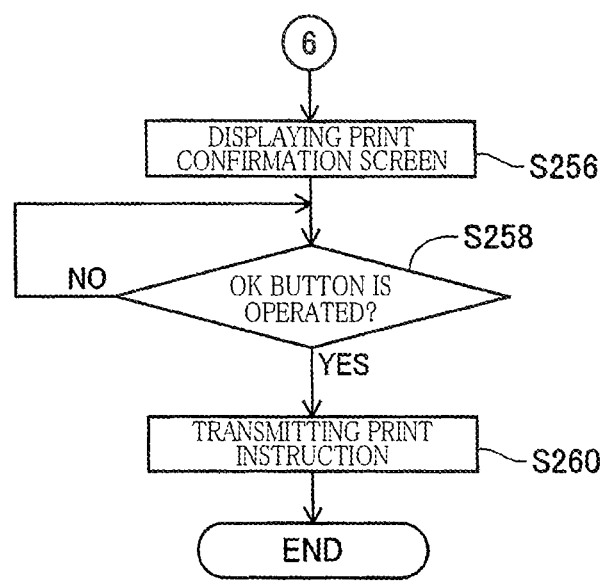
FIG. 10 is a flow chart illustrating processings executed by the mobile phone in the second embodiment.

There will be next explained (i) a flow of processings executed when the print program 50 is executed by the CPU 32 of the printer 30 in the second embodiment with reference to FIGS. 7 and 8, and (ii) a flow of processings executed when the control application 76 is executed by the CPU 62 of the mobile phone 60 in the second embodiment with reference to FIGS. 9 and 10. Some processings to be executed by the CPU 32 of the printer 30 and the CPU 62 of the mobile phone 60 in the flows in the second embodiment are similar to those to be executed by the CPU 32 of the printer 30 and the CPU 62 of the mobile phone 60 in the flows in the first embodiment, and the similar processings will be explained briefly. The scan program 26 to be executed by the CPU 12 of the scanner 10 in the second embodiment is identical to the scan program 26 to be executed by the CPU 12 of the scanner 10 in the first embodiment, and an explanation and illustrations of which are dispensed with.

When the print program 50 is executed by the CPU 32 in the printer 30, as illustrated in FIG. 7, the CPU 32 at S200 determines whether the CPU 32 receives data from the scanner 10. When no data is received from the scanner 10 (S200: NO), the CPU 32 repeats the processing at S200. When the data is received from the scanner 10 (S200: YES), the CPU 32 at S202 switches the printer 30 to a state in which the CPU 32 can receive the beacon signal. The CPU 32 at S204 determines whether the print processing for printing an image based on the scan data is the secure printing.

When the print processing for printing an image based on the scan data is the secure printing (S204: YES), the CPU 32 at S206 determines whether the CPU 32 receives the beacon signal via the short distance wireless communication interface 42. When the beacon signal is not received (S206: NO), the CPU 32 repeats the processing at S206. When the beacon signal is received (S206: YES), the CPU 32 at S206A determines whether the serial number contained in the beacon signal matches the serial number contained in the data received from the scanner 10. When the serial number contained in the beacon signal matches the serial number contained in the data received from the scanner 10 (S206A: YES), the CPU 32 at S207 transmits the response to the beacon signal via the short distance wireless communication interface 42. When the serial number contained in the beacon signal does not match the serial number contained in the data received from the scanner 10 (S206A: NO), the CPU 32 repeats the processing at S206A. It is noted that the response to the beacon signal contains information for identifying whether the print processing is the secure printing. This response is a connection request packet. After the response to the beacon signal is transmitted at S207, the CPU 32 at S207A stops transmitting the beacon signal via the short distance wireless communication interface 42.

The CPU 32 at S208 determines whether the two-way BLE communication between the printer 30 and the mobile phone 60 is established. When the two-way BLE communication is established (S208: YES) this flow goes to S210. When the two-way communication is not established (S208: NO), the CPU 32 repeats this processing until the two-way communication is established. It is noted that the CPU 32 can determine that the two-way communication is established with the mobile phone 60, to which the response is transmitted at S207, by determining that a packet received after the establishment of the two-way communication contains the identification information contained in the beacon signal that is determined to be received at S206. When the two-way BLE communication is established, the CPU 32 executes processings at S210 and subsequent steps, but the processings at S212 and subsequent steps are similar to those at the processings at S132 and subsequent steps in FIG. 4, and an explanation of which is dispensed with.

When the CPU 32 at S204 determines that the print processing for printing an image based on the scan data is not the secure printing (S204: NO), the CPU 32 executes the print processing at S222. The CPU 32 at S224 determines whether the print processing is completed. When the print processing is not completed (S224: NO), this flow returns to S222. When the print processing is completed (S224: YES), the CPU 32 at S226 determines whether the CPU 32 receives the beacon signal via the short distance wireless communication interface 42. When the beacon signal is not received (S226: NO), the CPU 32 repeats the processing at S226.

When the beacon signal is received (S226: YES), the CPU 32 at S227 determines whether the serial number contained in the beacon signal matches the serial number contained in the data received from the scanner 10. When the serial number contained in the beacon signal does not match the serial number contained in the data received from the scanner 10 (S227: NO), this flow returns to S226. When the serial number contained in the beacon signal matches the serial number contained in the data received from the scanner 10 (S227: YES), the CPU 32 at S228 transmits the response to the beacon signal via the short distance wireless communication interface 42. Upon completion of the processing at S228, the CPU 32 executes processings at S230 and subsequent steps, but the processings at S230 and subsequent steps are similar to those at the processings at S152 and subsequent steps in FIG. 3, and an explanation of which is dispensed with. It is noted that the response transmitted at S228 may not be the connection request packet because the two-way communication need not be thereafter established. In BLE, however, a device having received the connection request packet does not necessarily follow the connection request as described above. Thus, the response transmitted at S228 may be the connection request packet.

When the control application 76 is executed by the CPU 62 in the mobile phone 60, as illustrated in FIG. 9, the CPU 62 at S240 determines whether the NFC wireless communication between the scanner 10 and the mobile phone 60 is established. When the NFC wireless communication between the scanner 10 and the mobile phone 60 is not established (S240: NO), the CPU 62 repeats the processing at S240. When the NFC wireless communication between the scanner 10 and the mobile phone 60 is established (S240: YES), the CPU 62 at S244 starts transmitting the beacon signal via the short distance wireless communication interface 70.

The CPU 62 at S246 determines whether the CPU 62 receives the response to the beacon signal via the short distance wireless communication interface 70. When the response to the beacon signal is not received (S246: NO), the CPU 62 repeats the processing at S246. When the response to the beacon signal is received (S246: YES), the CPU 62 at S248 determines whether the print processing is the secure printing, based on information contained in the response to the beacon signal. When the print processing is not the secure printing (S248: NO), this flow ends.

When the print processing is the secure printing (S248: YES), the CPU 62 at S250 stops transmitting the beacon signal and establishes the two-way BLE communication in accordance with the response (i.e., the connection request packet) that is determined to be received at S246, and this flow goes to S256. Processings at S256 and subsequent steps are identical to the processings at S176 and subsequent steps in FIG. 6, and an explanation of which is dispensed with.

While the embodiments have been described above, it is to be understood that the disclosure is not limited to the details of the illustrated embodiments, but may be embodied with various changes and modifications, which may occur to those skilled in the art, without departing from the spirit and scope of the disclosure. For example, while the serial number of the mobile phone 60 is used as the identification information in the above-described embodiments, various kinds of information may be used as the identification information. Specifically, for example, the scanner 10 creates a one-time ID and transmits the one-time ID to a printer that is to execute the print processing, with information such as scan data. The printer incorporates the one-time ID into the beacon signal as the identification information and transmits the beacon signal to the mobile phone 60. The scanner 10 transmits the created one-time ID not only to the printer but also to the mobile phone 60. Upon receiving the one-time ID, the mobile phone 60 determines whether the one-time ID contained in the beacon signal matches the one-time ID received from the scanner 10. When the one-time ID contained in the beacon signal matches the one-time ID received from the scanner 10, the mobile phone 60 transmits the response to the beacon signal to the printer. The same effects as obtained in the above-described embodiments can be obtained by the above-described configuration in which the one-time ID created by the scanner 10 is used as the identification information.

In the above-described embodiments, the LED 46 of the printer that is to execute the print processing blinks in order to indicate that the printer provided with the blinking LED 46 is the printer that is to execute the print processing. The printer may indicate the printer that is to execute the print processing by controlling the display 36 to blink or controlling a speaker to produce sounds, for example.

In the above-described embodiments, the scanner 10 executes the scan processing and transmits the scan data created in the scan processing to the printer that is to execute the print processing. However, image data stored in an external device such as a PC may be transmitted to the printer that is to execute the print processing, for example.

In the above-described embodiments, the secure printing is executed when the print instruction is transmitted from the mobile phone 60 to the printer 30. However, the secure printing may be executed when Bluetooth wireless communication is established between the printer 30 and the mobile phone 60. Also, the secure printing is executed when particular authentication information is input to the input interface 38 of the printer 30, for example.

In the above-described embodiments, the short distance wireless communication interface is capable of performing the two-way communication and transmitting the beacon. In the first embodiment, however, the short distance wireless communication interface may use a module capable of only transmitting the beacon signal, and the CPU may control the module to transmit and stop the beacon signal and update information contained in the beacon signal, for example.

While the processings illustrated in FIGS. 2-10 are executed by the CPU 12, the CPU 32, and the CPU 62 in the above-described embodiments, other devices may execute these processing. For example, these processing may be executed by an ASIC or other logical integrated circuits and may be executed by cooperation of the CPU, the ASIC, and other the logical integrated circuits, for example.

What is claimed is:

1. An image recording apparatus, comprising:
    a first communication interface configured to perform communication with an image-data output device according to a first communication standard;
    a second communication interface configured to perform communication with a mobile terminal according to a second communication standard that is different from the first communication standard and that is a wireless communication standard;
    a notifier configured to provide a notification;
    an image recorder configured to perform image recording; and
    a processor configured to perform:
        controlling the first communication interface to receive image data and identification information, which distinguishes the mobile terminal from other terminals, from the image-data output device over the communication according to the first communication standard;
        controlling the image recorder to record an image on a recording medium based on the received image data;
        controlling the second communication interface to transmit the received identification information via the second communication interface according to the second communication standard,
        controlling the second communication interface to receive, from the mobile terminal, a response to the transmission of the identification information transmitted by the second communication interface according to the second communication standard; and
        controlling the notifier to provide a notification after the processor receives the response, from the mobile terminal, to the transmission of the identification information from the mobile terminal.

2. The image recording apparatus according to claim 1, further comprising a storage, wherein the processor is configured to perform:
    controlling the first communication interface to receive the image data, the identification information, and information indicating whether storage printing is to be performed based on the image data;

controlling the storage to store the received image data into the storage when the processor receives the information indicating that the storage printing is to be performed based on the image data; and controlling the image recorder to record an image on a recording medium based on the image data stored in the storage, after the processor receives, from the mobile terminal via the second communication interface, the response to the transmission of the identification information.

3. The image recording apparatus according to claim 2, wherein the processor is configured to perform:

controlling the second communication interface to transmit the received identification information over one-way communication;

controlling the second communication interface to receive, from the mobile terminal, the response to the transmission of the identification information over one-way communication; and when the processor receives, via the first communication interface, the information indicating that the storage printing is to be performed based on the image data, controlling the image recorder to record an image on a recording medium based on the image data received from the image-data output device, when two-way communication is established with the mobile terminal according to the second communication standard after the processor receives the response from the mobile terminal.

4. The image recording apparatus according to claim 1, wherein the processor is configured to perform:

controlling the second communication interface to transmit the received identification information; and controlling the second communication interface to stop transmitting the received identification information when the processor receives, from the mobile terminal, the response to the transmission of the identification information.

5. The image recording apparatus according to claim 1, wherein the identification information is information for identifying one mobile terminal communicable according to the second communication standard.

6. The image recording apparatus according to claim 1, wherein the second communication standard is Bluetooth low energy, and wherein the processor is configured to transmit the received identification information in a state in which the received identification information is incorporated in a beacon based on the Bluetooth low energy.

7. An image recording apparatus, comprising:

a first communication interface configured to perform communication with an image-data output device according to a first communication standard;

a second communication interface configured to perform communication with a mobile terminal according to a second communication standard that is different from the first communication standard and that is a wireless communication standard;

notifier configured to provide a notification;

an image recorder; and a processor configured to perform:

controlling the first communication interface to receive image data and identification information, which distinguishes the mobile terminal from other terminals, from the image-data output device over the communication according to the first communication standard;

controlling the image recorder to record an image on a recording medium based on the received image data;

controlling the second communication interface to receive a signal transmitted from the mobile terminal;

when the processor receives, from the mobile terminal via the second communication terminal, the signal which includes the received identification information, controlling the second communication interface to transmit a response to the reception of the signal including the identification information to the mobile terminal via the second communication interface; and controlling the notifier to provide a notification after the processor receives the signal, from the mobile terminal, including the identification information.

8. The image recording apparatus according to claim 7, further comprising a storage, wherein the processor is configured to perform:

controlling the first communication interface to receive the image data, the identification information, and information indicating whether storage printing is to be performed based on the image data;

controlling the storage to store the received image data into the storage when the processor receives the information indicating that the storage printing is to be performed based on the image data; and controlling the image recorder to record an image on a recording medium based on the image data stored in the storage, after the processor receives, from the mobile terminal via the second communication interface, the signal including the identification information.

9. The image recording apparatus according to claim 8, wherein the processor is configured to perform:

controlling the second communication interface to transmit the received identification information over one-way communication;

controlling the second communication interface to receive the signal including the identification information from the mobile terminal over one-way communication; and when the information indicating whether the storage printing is to be performed based on the image data is received via the first communication interface, controlling the image recorder to record an image on a recording medium based on the image data received from the image-data output device, when two-way communication is established with the mobile terminal according to the second communication standard after the processor receives the identification information from the mobile terminal.

10. The image recording apparatus according to claim 7, wherein the processor is configured to be switched to a state in which communication is allowed via the second communication interface according to the second communication standard, after the processor receives the image data and the identification information from the image-data output device via the first communication interface.

11. The image recording apparatus according to claim 7, wherein the processor is configured to perform:

controlling the second communication interface to receive a beacon from the mobile terminal, the beacon containing the identification information and distance information indicating a distance between the mobile terminal and the image recording apparatus; and controlling the second communication interface to transmit the response to the reception of the signal including the identification information to the mobile terminal when the distance indicated by the distance information is less than a particular distance.

\* \* \* \* \*